United States Patent [19]

Lageer et al.

[11] 4,251,085

[45] Feb. 17, 1981

[54] SNOW RUNNERS FOR SHOPPING CART

[76] Inventors: Reginald Lageer, c/o George Spector, 3615 Woolworth Bldg., 233 Broadway; George Spector, 3615 Woolworth Bldg., 233 Broadway, both of New York, N.Y. 10007

[21] Appl. No.: 30,960

[22] Filed: Apr. 17, 1979

[51] Int. Cl.³ .............................................. B62B 13/18
[52] U.S. Cl. ...................................... 280/10; 280/603; 280/33.99 A
[58] Field of Search .................. 280/33.99 C, 33.99 A, 280/8, 9, 10, 11, 11.15, 603, 7.12, 13, 23, 28.5

[56] References Cited

U.S. PATENT DOCUMENTS

| 397,617 | 2/1889 | Tilden | 280/28 |
|---|---|---|---|
| 1,603,588 | 10/1926 | Eberle | 280/11.15 |
| 2,332,404 | 10/1943 | Smith | 280/603 |
| 2,817,536 | 12/1957 | Taggert | 280/11 |
| 3,851,891 | 12/1974 | Liu | 280/11 |

FOREIGN PATENT DOCUMENTS

| 889217 | 12/1971 | Canada | 280/11 |
|---|---|---|---|
| 157365 | 9/1932 | Switzerland | 280/10 |

Primary Examiner—John J. Love
Assistant Examiner—D. W. Underwood

[57] ABSTRACT

A shopping cart for carrying groceries between a store and a persons home, and which includes snow runners which are movable between a stored away and utility positions so that in normal use the cart rides upon its wheels, and during winter snow and ice it travels upon the runners, each runner including a wear plate for sliding on the ice or snow surface and a flange along each side of the wearplate through which the cart axle extends for attachment of the runner to the cart.

2 Claims, 10 Drawing Figures

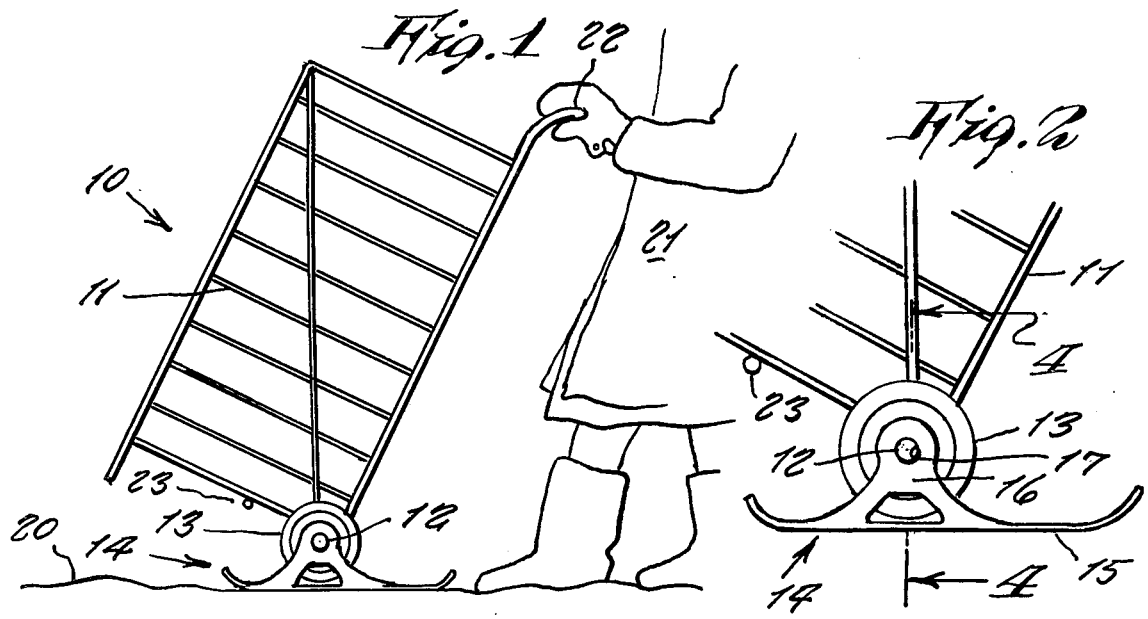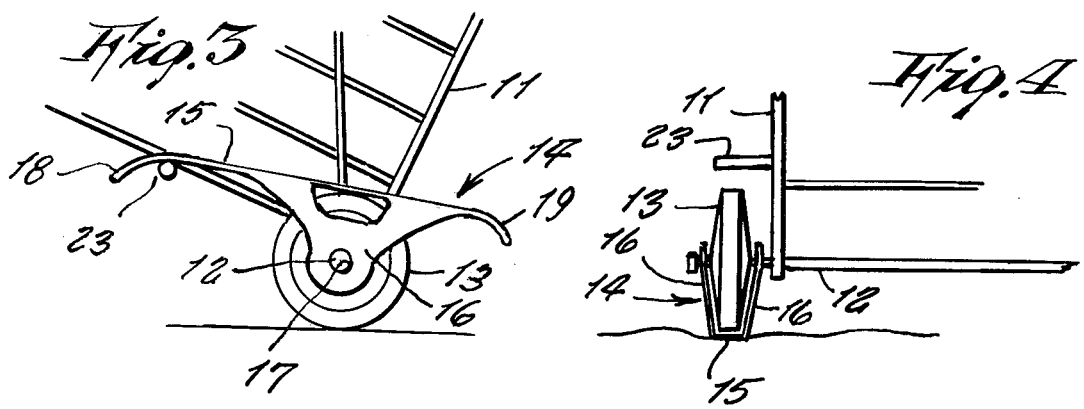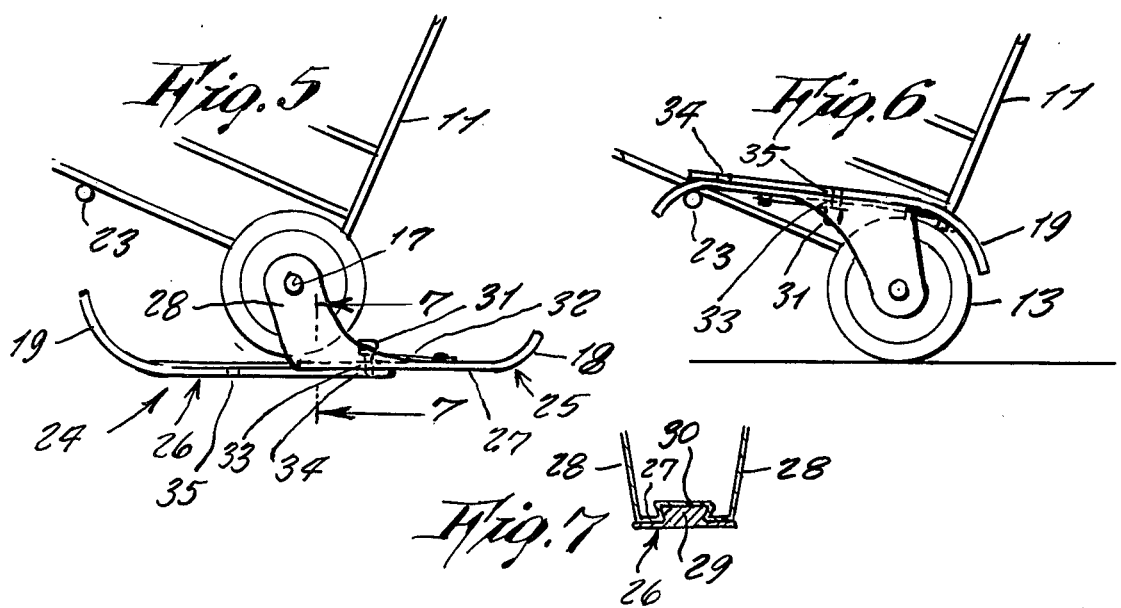

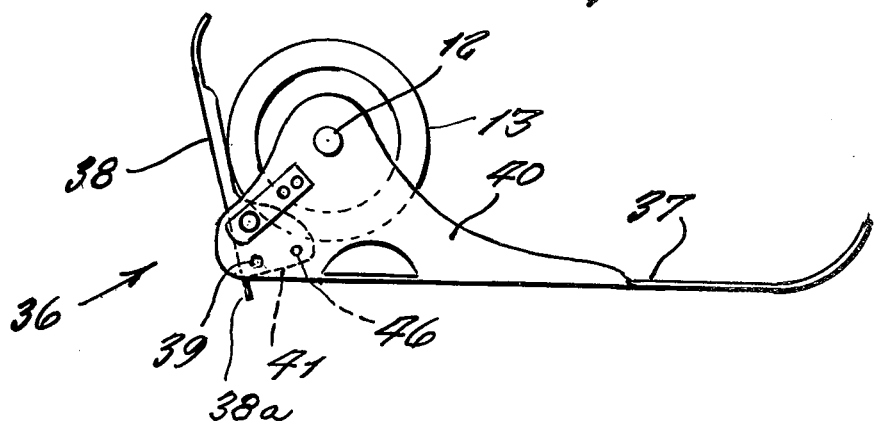
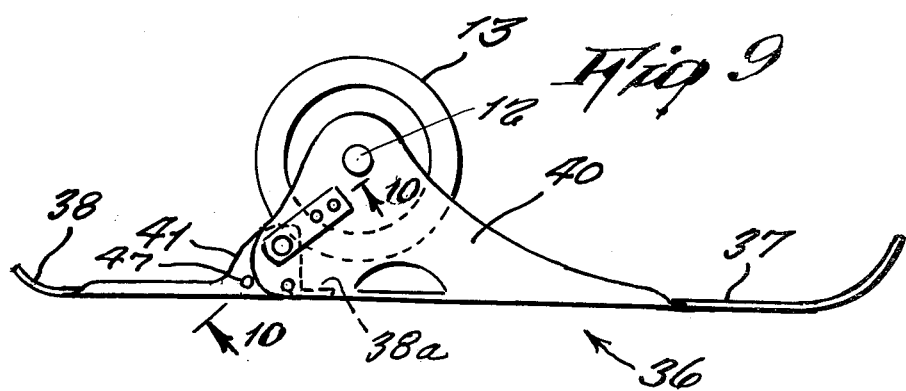
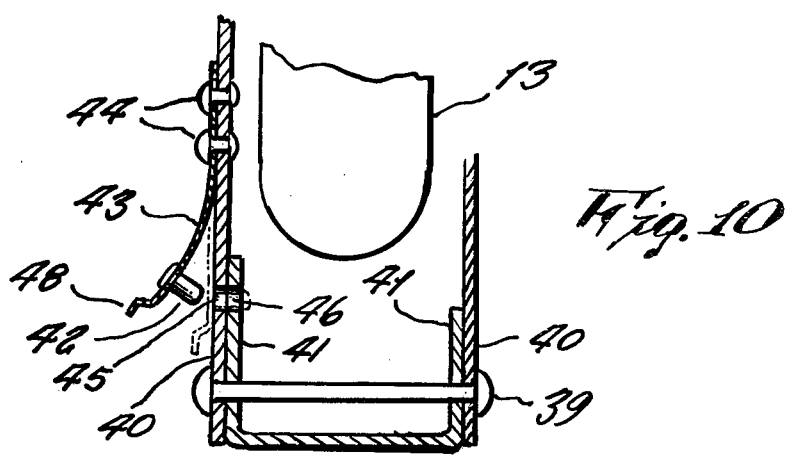

SNOW RUNNERS FOR SHOPPING CART

This invention relates generally to shopping carts.

It is well known to shoppers, who take home their purchases in a shopping cart from the supermarket or other store, that the shopping cart is eliminates the burden of carrying heavily loaded bags in the bags. The cart travels on wheels, so can be easily pulled or pushed. While this is easy during warmer seasons of the year, it ceases to be so, when winter snow covers the ground, and the shopping cart wheels cannot go through the deep snow. This situation is objectionable and is therefore in want of an improvement.

Accordingly, it is a principal object of the present invention to provide a wheeled shopping cart that includes runners which are quickly and easily movable from a stored, out-of-the-way position to an operative position in case of an accumulation of snow on a ground, so that the cart can then readily travel across the top of the snow.

Another object is to provide a shopping cart equipped with runners which in one design are telescopic so to be minimal in size when not in use and in no way project outward.

FIG. 1 is a side view of a shopping cart with the snow runners mounted thereon, and illustrated in operative use.

FIG. 2 is an enlarged detail thereof.

FIG. 3 is a view similar to FIG. 2, and showing the snow runners pivoted into a stored away position.

FIG. 4 is a cross sectional view on line 4—4 of FIG. 2.

FIG. 5 shows a modified design of the invention which consists of a front runner portion and a rear runner portion that are slidable together, FIG. 5 showing them in stretched out position and in use on a snow.

FIG. 6 shows the invention of FIG. 5 with front and rear portions slided close together and pivoted into a stored away position, this design eliminating any rearward extending portion that might be objectionable for a person to hit with a leg and get hurt on it, because it fits in this design close to the wheel.

FIG. 7 shows how the sliding front and rear portions are slidably locked together in a tongue and groove fit, a pin or a spring locking the parts in either position.

FIGS. 8, 9 and 10 show a modified design of the invention having runner members that are pivotal respective to each other.

Referring now to the drawing in greater detail, and more particularly to FIGS. 1 through 4 at this time, the reference numeral 10 represents a shopping cart according to the present invention wherein there is a wire basket 11 with axle 12 attached at its bottom that is mounted through a pair of wheels 13 in a conventional manner with one wheel at each side end thereof. In the present invention a runner 14 is pivotally mounted also at each end of the axle, each runner consisting of a long wear plate 15 with an angularly bent up flange 16 along each side edge thereof, and each flange having an aligned opening 17 through which the axle extends. The wear plate is flat except at its opposite ends 18 and 19 which are upwardly curved for guiding the runner over a top of a snow 20 when the cart is either pulled or pushed by a person 21 holding the cart handle 22. Each runner being U-shaped, when viewed from an end, fits around one of the wheels 13.

When there is no snow on a ground, the runners are manually pivoted into an upwardly out-of-the-way position shown in FIG. 3, and is secured in this position by resting upon a peg 23 projecting from each side of the basket, the runners thus exposing the wheels for travel on a ground.

In a modified design of the invention shown in FIGS. 5 through 7, a runner 24 is used that is telescopic so that when not in use, the runner end hugs closely around the wheel instead projecting outwardly where a persons leg might possibly bump thereagainst. The runner accordingly is made of inter-telescoping members 25 and 26, the first of which includes a wear plate 27 with bend up side flanges 28 at one end of the wear plate, instead at its center portion. The flanges include axle opening 17, and only the opposite end 18 of the wear plate has the upward curve. The member 26 is slidably mounted under the other member 25 by means of a wedge-shaped rib 29 thereof sliding in a corresponding groove 30 formed on an underside of the wear plate 27. The members are quickly and easily secured together either in extended or collapsed position by a pin 31 held on an end of a leaf spring 32 secured at its other end on the member 25, the pin extending through a hole 33 in the wear plate 27 and there selectively through either of a pair of holes 34 or 35 in the member 26. The member is flat throughout its length except for the upward curve at one end 19. After use in a snow, the members may be collapsed together if so wished, so to push out any snow that may have become lodged inside groove 30, and at a same time eliminate the runner to project menacingly for being bumped against by a foot.

In FIGS. 8, 9 and 10 there is shown another modified design of the invention which differs from design of FIGS. 5 to 7 by having runner members that are pivotable respective to each other instead being slidable, in order to overcome any possibility of ice forming on the runner, such as in groove 30, and which could prevent slid adjusting the members respective to each other.

In the design shown in FIGS. 8 through 10, a runner 36 is comprised of main (or front) runner member 37 and a rear runner member 38, and which are pivotably attached together by a pivot rivet 39 extending through each side flange 40 of the front runner and each side flange 41 of the rear runner.

A lock pin 42 is mounted on one end of a leaf spring 43 which at its other end is secured stationarily by means of two rivets 44 to an outer side of one of the side flanges 40. The pin 42 is aligned so to snap in a hole 45 in the side flange 40 and also snap into either a hole 46 or a hole 47 formed on side flange 41, depending upon whether the rear runner member is pivoted downwardly for operative use as shown in FIG. 9, or pivoted upwardly out of the way for non use, as shown in FIG. 8. This design appears to have less adjusting problems in case of any icing forming on the runner. An outwardly offset lip 48 on the end of the leaf spring allows easy grasp thereof in order to lift the pin out of holes 46 or 47, when making a runner adjustment.

The runner members secured together as shown in FIG. 8, are then pivoted together around axle 12 until rested upon peg 23, out of the way, as above described.

An extension 38a on a forward end of the runner wearplate 38 forms a spur that digs downward against a ground surface when the wearplate is in a stored position, as shown in FIG. 8, and serves as a brake retarding the cart to be pulled, thus serving as a reminder to pivot the runner into a horizontal position, as shown in FIG. 9, before trying to slide on snow or ice.

What is claimed is:

1. A shopping cart, comprising in combination a wire basket with transverse axle secured at its bottom, a wheel mounted on each end of said axle, said basket including a handle for pulling or pushing, and a U-shaped snow runner pivotally mounted on said axle fitting around each said wheel, said runners being adjustable by each being comprised of first and second runner members that are pivotable between an operative position and a stored, out of the way position, a peg projecting sidewardly from opposite sides of said basket so to serve as a rest upon which said runners rest in said stored position, and opposite forward and rear ends of each said runner being upwardly curved for guiding across a top of a snow, each said first member comprising a flat wearplate having an upturned flange on each opposite side thereof, said flanges each having a hole therethrough, said holes being aligned for fitting on one end of said axle wherein each said second runner member comprises a flat wear plate slidably held on an underside of each said first runner member wear plate by a wedge-shaped rib correspondingly shaped groove of the other said member and a pin means securing said members in a selected position.

2. A shopping cart, comprising in combination a wire basket with transverse axle secured at its bottom, a wheel mounted on each end of said axle, said basket including a handle for pulling or pushing, and a U-shaped snow runner pivotally mounted on said axle fitting around each said wheel, said runners being adjustable by each being comprised of first and second runner members that are pivotable between an operative position and a stored, out of the way position, a peg projecting sidewardly from opposite sides of said basket so to serve as a rest upon which said runners rest in said stored position, and opposite forward and rear ends of each said runner being upwardly curved for guiding across a top of a snow, each said first member comprising a flat wearplate having an upturned flange on each opposite side thereof, said flanges each having a hole therethrough, said holes being aligned for fitting on one end of said axle wherein each said second runner member comprises a flat wear plate with an upturned flange on each opposite side thereof, a single rivet extending through both said flanges of both said members for pivotal movement between said members, a leaf spring stationarily affixed at one end to an outer side of a first member flange, an opposite end of said leaf spring having a pin receivable in a hole through said first member flange and selectively through either of two holes in a second member flange according to a pivoted position of said second member.

* * * * *